United States Patent [19]

Lewis et al.

[11] Patent Number: 5,110,609
[45] Date of Patent: May 5, 1992

[54] INTERMEDIATE MOISTURE VEGETABLES

[75] Inventors: Victor M. Lewis; David A. Lewis, both of New South Wales, Australia

[73] Assignee: Byron Agricultural Company Pty. Ltd., Sydney, Australia

[21] Appl. No.: 668,012

[22] Filed: Mar. 12, 1991

Related U.S. Application Data

[63] Continuation of Ser. No. 30,577, Mar. 27, 1987, abandoned, which is a continuation-in-part of Ser. No. 862,216, Apr. 23, 1986, abandoned.

[30] Foreign Application Priority Data

Sep. 17, 1984 [AU] Australia .................. PG 7174

[51] Int. Cl.$^5$ .................................. A23B 7/00
[52] U.S. Cl. ........................ 426/402; 426/404; 426/465; 426/640
[58] Field of Search ........... 426/331, 326, 335, 333, 426/402, 404, 640, 465

[56] References Cited

U.S. PATENT DOCUMENTS

| | | | |
|---|---|---|---|
| 4,384,009 | 5/1983 | Lewis et al. | 426/331 |
| 4,447,460 | 5/1984 | Lewis et al. | 426/640 |
| 4,496,597 | 1/1985 | Reges | 426/640 |

OTHER PUBLICATIONS

Woodroof et al., Commercial Fruit Processing, published by The AVI Publishing Company, Inc., 1975 (pp. 374–383).

Primary Examiner—George Yeung
Attorney, Agent, or Firm—Scully, Scott, Murphy & Presser

[57] ABSTRACT

A process for producing an intermediate moisture vegetable or fruit product which is microbiologically stable at water activity levels within the range of 0.5 to 0.95 and is free from additives used to prevent microbial spoilage, which process consists essentially of the steps of partially dehydrating a vegetable or fruit to a moisture content of from 26% to 60% and thereafter holding the resultant product in an oxygen free or substantially oxygen free environment.

17 Claims, No Drawings

INTERMEDIATE MOISTURE VEGETABLES

This is a continuation of copending application Ser. No. 030,577, filed on Mar. 27, 1987, now abandoned, which is a continuation-in-part of Ser. No. 862,216 filed on Apr. 23, 1986, now abandoned.

The present invention relates to a process of producing fruits and vegetables of intermediate moisture content, hereinafter referred to as a plant product. The term vegetables as used herein denotes all types of produce normally regarded as vegetables including leaves, roots, bulbs, stems and immature and mature fructifications thereof. The term also includes non-edible plant material. The term fruits refers to the sweet fleshy fructifications of plants normally referred to as fruits.

Dehydrated vegetables have long been products of commerce. They may be produced by hot air drying, freeze drying, puff or explosion drying, osmotic drying or other methods. Irrespective of the method used for drying, the distribution and use in commerce of dehydrated vegetables has been restricted to products which are usually hard and brittle having moisture levels between about 2% and 8% and with water activities usually below moisture 0.5. If moisture levels or water activities rise above these levels, the products are regarded as unstable with relatively rapid and undesirable deterioration in colour, flavour and aroma. If the water activity rises above 0.6, the products are susceptible to microbial action.

Vegetables at these low moisture contents suffer from the following disadvantages:
1. They are slow to rehydrate;
2. They usually have, after reconstitution, a disagreeable "dehydrated" or "hay like" flavour;
3. They are excessively brittle, shatter easily, puncture packaging materials as a result of sharp edges; and
4. Their texture, after rehydration, still remains somewhat flaccid as a result of irreversible changes to cell structures which have occurred at low moisture contents during manufacture.

In commercial practice vegetables can be dried in the initial stages of the process to a moisture content of 10 to 15% in a relatively short space of time. The final stages of drying whereby the moisture content is taken down to the mentioned levels of 2% to 8% is slow and costly, and it is during these last stages of dehydration that most deteriorative changes occur.

The time and quality problems associated with this final drying stage have been overcome to some extent by processes such as dehydrofreezing, where the product is first partially dried, then frozen, and dehydrosalting where the product is partially dehydrated then stored in salt brine. However, disadvantages are the cost of freezing and of frozen storage on the one hand, and the presence of liquid brine and high concentrations of salt on the other hand.

Australian Pat. No. 532,414 (Lewis and Lewis) described a method whereby salt with or without other solutes is readily introduced into partially dehydrated vegetables, to produce intermediate moisture products of good stability with relatively high water activity levels (0.45-0.85) and relatively high moisture contents (up to 25%). The production of these vegetables involves a two stage dehydration process separated by a short impregnation step.

Experiments conducted by the applicants in relating the moisture content of vegetables during dehydration to the water activity, have revealed that as the moisture content of the vegetable is reduced, so the eater activity drops from just below 1.0 for the fresh vegetable, to below 0.5 as the vegetable is reduced to 10% moisture or thereabouts. As the vegetables are reduced below this moisture content they become progressively harder and more brittle and rehydration time increases.

It is well known that in order to protect foods from bacterial growth, the food should be at a water activity below 0.85. However, moulds and yeasts have been observed to grow in an environment as low as 0.6 (see JA Troller, Food Technology 1979 Jan. 72–75; Troller JA and Christian JHB "Water Activity of Foods" Academic Press 1981). It has therefore been usual practice to add to foods in the water activity range of 0.60-0.85 artifical preservatives such as sorbic acid and sorbates or sulphites etc. to inhibit growth of yeasts and moulds. Food legislation in many countries recognises the possible danger of commercial distribution of non-acid non-sterile processed foods above a water activity of 0.85 by requiring such foods to be held and distributed under refrigeration.

The applicants have discovered that in the range of water activities between 0.5 and 0.85, the partially dehydrated vegetables in general have excellent colour and are for the most part still pliable, rehydrate very rapidly and when rehydrated have excellent flavour, texture and aroma.

While most vegetables partially dehydrated to water activities of 0.5 to 0.85 will deteriorate in flavour and colour, and may be subject to microbiological spoilage if not treated with preservatives, applicants have found, surprisingly, that a wide range of fruits and vegetables in this water activity range which have been studied, if packed in an oxygen free atmosphere keep in excellent condition for substantial periods, in some cases over two years at ambient temperature.

Commercially dried fruits which are commonly available tend to be tough and leathery in texture, dark and unattractive in colour, and have a typical carramelized flavour, which lacks the fresh-fruit aroma. The high level of sulphur dioxide, usually between 2,000 and 3,000 ppm, normally found in dried fruits is often distasteful.

The applicants have found that a wide variety of fruit products including apples, peaches, pears, plums, bananas, papayas and pineapples, can be prepared with excellent flavour and aroma by treating the fruit products in the manner herein set forth for vegetables.

However with certain fruits such as peaches, apples and pears which darken readily due to enzyme action when the tissue is cut, it is desirable to treat the prepared fruit pieces with sulphur dioxide so that the sulphur dioxide content of the dried fruit is below 1000 ppm and preferably between 100 and 1000 ppm. Other fruits, such as plums, grapes and raspberries do not necessarily need pretreatment with sulphur dioxide. Most common fruits have pH values under 4.5, and when dehydrated, the pH levels are lowered further by concentration of the acids. It is, therefore, "safe" from a bacteriological point of view to dehydrate acid fruits to a higher water activity than the upper limit of 0.85 mentioned for vegetables. The upper limit for these acid fruits is largely a matter of the final texture desired in the product. For the most part, fruit dehydrated to 40% to 50% of their original weight tend to be soft and have a moist feel, but the degree of dehydration chosen is a matter of preference and also a question of the purpose for which the fruit are to be used. Samples of some acid fruit with water activities as high as 0.95 and moisture contents about 60% when packaged in the absence of oxygen are stable over many months of storage at ambient temperatures.

Fruit dehydrated to water activites of 0.70–0.95, with moisture contents of 25% to 60% and packaged in an oxygen-free environment have excellent tenderness, flavour and general acceptability. For those fruits to which, for the purpose of colour maintenance, sulphur dioxide or sulphite has to be added, the quantity used is far less than is generally found in conventional dried fruit, and the flavour is accordingly preferred.

Surprisingly, and in contrast to existing technology for conventional fruit dehydration, it has been found that within limits, the higher the moisture content of the fruit, the better the colour and flavour is retained over prolonged storage. It is believed that this may be due to these factors amongst others;

(1) The less the degree of dehydration, the less loss there is during processing of colour, flavour texture and aroma.
(2) The higher the residual moisture content of the dehydrated fruit, the less concentrated the reactants which are concerned with non-enzymatic browning, and the lesser the degree of discolouration.
(3) The anaerobic conditions have a sparing effect on sulphites that may have been used.

The invention according to one aspect provides a process for producing a plant product of intermediate moisture content which is microbiologically stable at water activities within the range of 0.5 to 0.95 and is free from agents used to prevent microbial spoilage (preservatives) which comprises the steps of partially dehydrating fruit or vegetables until the moisture content is reduced to 10% to 60% and there after holding the resultant product in an oxygen free or substantially oxygen free atmosphere. Preferably the product is packed in a container of low oxygen permeability, all or substantially all of the free oxygen gas is removed therefrom and optionally replaced with an oxygen-free inert gas or alternatively said product is stored under vacuum.

The so called gas packaging of foods is not in itself novel. For the most part, however, the use of inert gas or vacuum has been used to prevent the development of rancidity in such products as milk powder, coffee, nuts, etc. Gas packaging has also been used for conventional fully dried vegetables such as carrots in an attempt to lessen the "hay like" odour that develops in some of these products. Gas packaging has also been used with fresh fruits and vegetables to prolong the shelf-life under refrigeration, but the use in these circumstances is for the main purpose of controlling respiration of the plant tissue and the degree of extension of shelf life is quite modest.

Work is reported in the literature (Advances in Food Research, Vol I, pp 342–346, 1948, Academic Press, N.Y. U.S.) on the effect of oxygen on the deterioration of dried fruit. These studies, however, refer to the darkening of such fruits at conventional moisture levels. The effect of oxygen on the microbiological stability and the quality of dried fruits at higher than normal moisture contents is not reported or contemplated. The oxygen free packaging enables the manufacture of intermediate moisture products with moisture contents of 10–60%, and with water activity levels between 0.5 to 0.95, with good shelf-life at ambient temperatures and excellent retention of colour and quality. By additionally using refrigerated storage, useful shelf-life can be obtained for a non-acid vegetable product held in oxygen free or substantially oxygen free atmosphere at water activity levels above 0.85.

In one form of the invention the oxygen gas is evacuated from a package of the plant product with the aid of pumps and in another form of the invention the oxygen gas is removed from the package with the aid of oxygen absorbers placed within the package.

The invention according to another aspect comprises a plant product of intermediate moisture content which is bacteriologically stable at water activities within the range of 0.5 to 0.95 and which is free from artificial preservatives said plant product being held in an atmosphere which is oxygen free or substantially oxygen free.

The more completely the oxygen is removed, in most cases, the better the keeping quality of the product.

For storage, the product should be packed in oxygen impermeable containers such as cans or glass jars, or in flexible packaging materials with low oxygen permeability such as aluminium foil laminates or clear laminates made with polyvinylidene chloride or other similar low oxygen impermeable materials.

In packaging, the oxygen should be removed from the container and replaced with an oxygen free inert gas such as nitrogen or a mixture of such gases, and/or oxygen absorbers such as finely powdered iron in suitably prepared pouches should be included in the packages.

High speed equipment for inert gas packaging is commonly available as is equipment for vacuum packaging. Likewise, the operation of inserting oxygen absorbing pouches can be mechanised. Other oxygen absorbing systems are described in the technical liturature (Lewis, Rambottom and Craine U.S. Pat. No. 3,419,400; Buckner, N. German Patent No. 81.48,240) and these may be used depending on their cost and efficiency.

With many vegetables, such as carrots, red peppers and sweet potatoes, prepared in this water activity range, no additives are necessary and excellent colour retention is obtained. With other vegetables, such as potatoes and onions and with fruits, it may be necessary to add modest quantities of sulphite or sulfur dioxide before packaging to minimise discoloration during storage. However the sulfur dioxide is to prevent discolouration, and need not be used in quantities commonly used to inhibit the growth of yeasts and moulds.

According to one form of the invention the fruits or vegetables are trimmed and cut as required to be suitable for dehydration. They are then dehydrated in any conventional manner, with or without prior blanching in steam, water or by other means, to a stage where the water activity lies between 0.5 and 0.85 for non-refrigerated vegetables or 0.70–0.95 for fruits. They may optionally be treated before, during or after dehydration with sufficient levels of sulfur dioxide or sulfites and/or other additives to inhibit discolouration during storage. Either before, during or after dehydration the fruit or vegetables may be flavoured or seasoned or treated with vitamins, minerals, colouring substances etc. as may be required. Finally, they are packaged and maintained in an atmosphere which is oxygen free or substantially free from oxygen. An oxygen free atmosphere can additionally or alternately be maintained in the package by the absorption of oxygen within the package by the use of oxygen absorbers of different types such as iron powders, glucose-glucose oxidase systems etc.

The invention will now be described in further detail with reference to the following non limiting examples.

EXAMPLE I

Sweet Potatoes

Orange fleshed sweet potatoes were peeled, and cut into slices 3 mm thick. These were blanced in steam of 2 mins, then washed with a water spray and placed on trays in a dehydrator.

The sweet potatoes were dried to moisture contents of 18.3%, 14.8% and 10.7% at which moisture contents the water activities were 0.82, 0.77 and 0.61 respectively.

All samples were packaged in laminated bags of aluminium foil and polythene, and were sealed in an atmosphere of nitrogen (after evacuation). Samples at each moisture Content were stored at 40° C. and at ambient temperature (about 22° C.). The samples at 40° C. were still in excellent condition in regard to flavour and colour, after four months storage. At ambient temperature, the sweet potatoes were in excellent condition after thirteen months storage. Based on the storage stability at 40° C., it was estimated that the product would have a shelf-life of about two years at ambient temperatures.

EXAMPLE II

Potatoes

Potatoes were peeled and cut into strips 3 mm×3 mm. These strips were blanced in boiling water for three minutes, washed to remove surface starch, and placed in the dehydrator. When the moisture content was about 40%, the potato shreds were removed from the dehydrator and tumbled with a solution of sodium sulphite, such that the final sulphur dioxide content of the dried potatoes was about 250 ppm. The potatoes were returned to the dehydrator and were dried to a moisture content of 15.6%. The water activity of the potatoes at this moisture content was 0.85. The shreds were a good pale colour, and were not brittle. The were packed in nitrogen in foil pouches and stored at ambient temperatures.

Samples were opened monthly. After five months the products were excellent but after six months, the shreds had developed a slight off-colour, but had good aroma and flavour.

EXAMPLE III

Carrots

Carrots were peeled and shredded into strips of 3 mm×3 mm section. These were blanched in steam for four minutes and dried in a through-bed dryer at 70° C. Samples were removed at moisture contents of 29.7%, 13.6% and 10.0%. The water activities of these samples were 0.82, 0.65 and 0.50 respectively.

When added to boiling water, the samples cooked in 3 to 5 minutes, and all were of excellent flavour and texture when cooked.

The samples were packaged in clear, laminated film made from layers of polyvinylidene chloride, nylon and polyethylene, and sealed after the addition of a small sachet of oxygen absorber. ("Ageless", manufactured by Mitsubishi Gas and Chemical Co., Tokyo, Japan.)

After thirteen months storage at ambient temperature, all three samples had retained excellent aroma, flavour and colour.

EXAMPLES IV

Red Peppers

Red bell peppers were cored and cut into dice of approximately 7 mm. They were dried at 70° in a forced air through bed dehydrator to a moisture content of 20%. At this moisture content they had a water activity of 0.67. The pepper dice had a bright red colour, had a pliable texture, and when cooked resembled fresh cooked peppers in colour, texture and flavour. The dried dice were packaged in low oxygen transmission laminated film together with oxygen absorber pouches.

The peppers retained their bright colour for about 8 weeks when stored at 40° C., and were still excellent in colour and flavour after thirteen months storage at ambient temperatures.

EXAMPLE V

Peaches

Peaches of the variety "Dawn" were peeled, halved and pitted and each half cut into two. The quarters were dipped for 2 minutes in 2% sodium metalsulphite solution. The fruit was drained and dried at 50° C. to a moisture content of 58%, and a water activity of 0.90. The dried peached were packed in laminated aluminium foil in nitrogen. After twelve months storage at ambient temperature, the fruit had bright colour, crisp, firm texture and excellent flavour.

EXAMPLE VI

Apples

Apples of the Jonathon variety were peeled, cored and cut into wedges each one twelfth of the fruit. The wedges were dipped for 5 mins. in a 0.1% sodium sulphite solution, drained and dehydrated at 70° C. until they were reduced to a moisture content of 42.7% and a water activity of 0.93. The sulphur dioxide content was 485 ppm.

The apple pieces were packed in low oxygen transmission film together with an oxygen absorber and stored refrigerated at below 5° C.

After twelve months storage, the apples showed no signs of deterioration, and had excellent colour, flavour and aroma.

EXAMPLE VII

Apples

Apples of the Granny Smith variety were peeled, cored and cut into slices 3 mm in thickness. After slicing, the apples were dipped in a 1% solution of sodium sulphite for one minute, and then drained. The apple slices were dried in a through bed dehydrator at 70° C. The sliced apples were dried to a moisture content of 37.7%, at which they had a water activity of 0.79. The sulphur dioxide content was 410 ppm.

The slices were packed in nitrogen in foil pouches and kept at ambient temperature. After ten months, the fruit was still white in colour and had a fresh aroma and flavour.

EXAMPLE VIII

Pears

Pears of the Packham variety were peeled, cored and cut into wedges, each representing about one eighth of the whole fruit. The fruit pieces were dipped for 1 min. in a 1% solution of sodium sulphite, were drained, and dried in a through bed dehydrator at 70° C. to a moisture content of 43.4% and a water activity of 0.82. The final sulphur dioxide content was 960 ppm.

The pears had a pale colour and a fresh flavour and aroma.

The pear segments were packaged in low oxygen transmission film with proprietary oxygen absorbers. The dried fruit showed no apparent spoilage or deterioration in colour or flavour after 10 months storage at ambient temperatures.

In some cases e.g. grapes, the use of sulphur dioxide is not necessary.

EXAMPLE IX

Grapes

Grapes of the Thompson Seedless variety were dipped in 2.5% potasium carbonate solution to render the skin more permeable, and dried at 70° C. to a water activity of 0.85. The moisture content was 35.5%. The grapes were packed in nitrogen in a foil laminate pouch. After twelve months storage at room temperature, the grapes were in excellent condition.

EXAMPLE X

Plums

Plums of the d'Argen variety were halved and pitted. They were dried to a moisture content of 52.8% and a water activity of 0.88.

They were packed in a foil, laminate pouch in nitrogen, and stored at ambient temperature. After twelve months, the fruit had excellent colour, flavour and texture.

We claim:

1. A process for producing an intermediate moisture vegetable or fruit product which is microbiologically stable at water activity levels within the range of 0.5 to 0.95 and is free from additives used to prevent microbial spoilage which consists essentially of the steps of partially dehydrating a vegetable or fruit to a moisture content of from 26% to 60% and thereafter holding the resultant product in an oxygen free or substantially oxygen free environment.

2. A process as claimed in claim 1 in which said fruit or vegetable is treated either before, during or after dehydration with at least one additive selected from the group consisting of discoloration inhibiting agents, flavoring agents, minerals, vitamins and coloring agents.

3. A process as claimed in claim 1 wherein said plant product is packed in a container and the oxygen in the container is removed with the aid of pumps.

4. A process as claimed in claim 1 wherein the oxygen in said container is removed by oxygen absorbers placed within the container.

5. A process as claimed in claim 3 or 4 wherein said oxygen is replaced with an inert gas.

6. A process as claimed in claim 5 wherein said inert gas is nitrogen.

7. A process as claimed in claim 1 wherein said product is blanched prior to said dehydration step.

8. A process of producing a fruit product of intermediate moisture content which is microbiologically stable at water activity levels of 0.70 to 0.95 and which is free from additives used to prevent microbial spoilage which consists essentially of the steps of treating a fruit material with a sulphite solution to give said fruit a sulphur dioxide content of between 100 to 1,000 ppm, dehydrating said fruit to reduce the moisture content thereof to 25 to 60% and thereafter holding the resultant fruit product in an oxygen free or substantially oxygen free container.

9. A process as claimed in claim 8 in which said fruit is treated either before, during or after dehydration with at least one member selected from the group consisting of discolouration inhibiting agents, flavouring agents, minerals, vitamins and colouring agents.

10. A process as claimed in claim 8 wherein said fruit is packed in a container and the oxygen in the container is removed with the aid of pumps.

11. A process as claimed in claim 8 wherein the oxygen in said container is removed by oxygen absorbers placed within the container.

12. A process as claimed in claim 10 or 11 wherein said oxygen is replaced with an inert gas.

13. A process as claimed in claim 12 wherein said inert gas is nitrogen.

14. A plant product which is microbiologically stable at water activity levels of 0.50 to 0.95 and which is free from agents used to prevent microbiological spoilage, said plant product consisting essentially of fruit or vegetable material which has had its moisture content reduced to 40 to 60% and is stored in an oxygen free or substantially oxygen free container.

15. A process for preparing an intermediate moisture fruit product which is microbiologically stable at water activity levels of from 0.70–0.95 and is free from additives used to prevent microbiological spoilage which consists essentially of the steps of partially dehydrating said fruit to a moisture content of from 40% to 60% and thereafter holding the resultant product in an oxygen free or substantially oxygen free environment.

16. The process of claim 15 wherein said fruit is treated with a sulphite solution to give said fruit a sulphur dioxide content of between 100 to 1,000 ppm.

17. The process of claim 15 wherein said fruit is treated with at least one member selected from the group consisting of discoloration inhibiting agents, flavoring agents, minerals, vitamins and coloring agents.

* * * * *

UNITED STATES PATENT AND TRADEMARK OFFICE
CERTIFICATE OF CORRECTION

PATENT NO. : 5,110,609
DATED : May 5, 1992
INVENTOR(S) : Victor M. Lewis

It is certified that error appears in the above-identified patent and that said Letters Patent is hereby corrected as shown below:

Column 1, line 25: delete first occurrence of "moisture"

Column 1, lines 58-59: "described" should read as --describes--

Column 2, line 2: "eater" should read as --water--

Column 8, line 1, Claim 3: delete "plant"

Signed and Sealed this

Twenty-third Day of November, 1993

BRUCE LEHMAN

Attest:

Attesting Officer      Commissioner of Patents and Trademarks